(12) United States Patent
Bhattacharya et al.

(10) Patent No.: US 12,143,426 B2
(45) Date of Patent: Nov. 12, 2024

(54) HEURISTIC MODEL TO SELF-MANAGE AND AUTO-UPDATE CONTAINERIZED SERVICES

(71) Applicant: Musarubra US LLC, San Jose, CA (US)

(72) Inventors: Anamika Bhattacharya, Bangalore (IN); Deepak Bharadwaj, Bangalore (IN); Sriranga Seetharamaiah, Bangalore (IN); Abhisek Sanyal, Bangalore, IN (US); Siddaraya Revashetti, Cupertino, CA (US)

( * ) Notice: Subject to any disclaimer, the term of this patent is extended or adjusted under 35 U.S.C. 154(b) by 173 days.

(21) Appl. No.: 17/720,860

(22) Filed: Apr. 14, 2022

(65) Prior Publication Data
US 2022/0337633 A1 Oct. 20, 2022

(30) Foreign Application Priority Data
Apr. 15, 2021 (IN) .............................. 202141017521

(51) Int. Cl.
*H04L 9/40* (2022.01)
(52) U.S. Cl.
CPC ................................. *H04L 63/205* (2013.01)
(58) Field of Classification Search
None
See application file for complete search history.

(56) References Cited

U.S. PATENT DOCUMENTS

| | | | |
|---|---|---|---|
| 2015/0172321 A1* | 6/2015 | Kirti | H04L 63/1425 726/1 |
| 2019/0297118 A1* | 9/2019 | Haugsnes | H04L 63/1441 |
| 2020/0213336 A1* | 7/2020 | Yu | H04L 63/1425 |
| 2020/0336513 A1* | 10/2020 | Martin | H04L 63/0263 |
| 2022/0337598 A1* | 10/2022 | Bhattacharya | H04L 63/104 |
| 2022/0337631 A1* | 10/2022 | Bhattacharya | H04L 63/0245 |

* cited by examiner

*Primary Examiner* — Shirley X Zhang
(74) *Attorney, Agent, or Firm* — Hanley, Flight & Zimmerman, LLC

(57) ABSTRACT

An apparatus includes a network interface and a processor.
a network interface that receives a call report including an application programming interface (API) name of an API, a service name of a security service, and an identifier of a customer apparatus; and
a processor configured to build a first first-order model, at least in part based on the API name, to perform a determination that an update for the security service is available, and to produce an update request, at least in part based on the first-order model and the determination, wherein
the network interface transmits the update request to the customer apparatus.

20 Claims, 9 Drawing Sheets

HEURISTIC MODEL TO SELF-MANAGE AND AUTO-UPDATE CONTAINERIZED SERVICES

CROSS-REFERENCE TO RELATED APPLICATION

This application claims the benefit of priority under 35 U.S.C. § 119(e) to Indian Provisional Application No. 202141017521, entitled "Heuristic Model To Self-manage and Auto-Update Containerized Services," inventors Bhattacharya et al., filed in the Indian Patent Office on Apr. 15, 2021, which is hereby incorporated by reference in its entirety. This application is related to concurrently-filed applications entitled "SYSTEM AND METHOD TO CREATE ZERO TRUST FRAMEWORK FOR SECURITY AS A SERVICE," inventors Bhattacharya et al., U.S. application Ser. No. 17/720,647, filed in the U.S. Patent Office on Apr. 14, 2022, and "DISTRIBUTED HYBRID MODEL FOR SECURITY AS A SERVICE," inventors Bhattacharya et al., both of which are hereby incorporated by reference in their entireties.

BACKGROUND

Technical Field

This disclosure relates to computer security and, in particular, to updating services.

Related Art

Currently, several products ship appliances that run as services in a customer environment. Shipping solutions include (i) shipping virtual machines (VMs) with services and (ii) shipping containerized services managed by an orchestration platform.

Vendors ship VMs with services as a monolithic architecture. There are several problems with shipping VMs with services: management, updates, high availability, auto-scaling, and cost.

Shipping containerized services lowers cost but has its own challenges. For example, this solution can require a separate orchestration platform, like Kubernetes, to achieve auto-scaling and high availability. The orchestration platform, in turn, can require additional overhead to configure and manage the orchestration platform.

No cloud-managed orchestration platform like Azure Kubernetes Service (AKS), Amazon Elastic Kubernetes Service (EKS), Google Kubernetes Engine (GKE) natively supports auto-updates for containerized services. For example, Kubernetes supports, depending on the configuration, updates to the platform itself. The services that are running on top of the Kubernetes platform are not included in the updates.

Further, there can be deployment complexities associated with the orchestration layer. For example, full-fledged orchestration platform deployment is not ideal for Edge and Internet of Things (IoT) devices.

Some existing solutions additionally deploy a control pane along with containerized services. Disadvantageously, the control pane is additional overhead for customers and increases operational cost and management complexity for information technology (IT) teams.

BRIEF SUMMARY

An apparatus includes a network interface that receives a call report including an application programming interface (API) name of an API, a service name of a security service, and an identifier of a customer apparatus; and a processor configured to build a first first-order model, at least in part based on the API name, to perform a determination that an update for the security service is available, and to produce an update request, at least in part based on the first-order model and the determination, wherein the network interface transmits the update request to the customer apparatus.

DETAILED DESCRIPTION

For purposes of illustrating the present innovation, it might be useful to understand phenomena relevant to various implementations of the disclosure. The following foundational information can be viewed as a basis from which the present disclosure can be explained. Such information is offered for purposes of explanation only and, accordingly, should not be construed in any way to limit the scope of the present disclosure and its potential applications.

In various implementations, a system and a method can provide a solution to deploy, update, and manage containerized services. Particular implementations can eliminate update overhead for services shipped to customers.

Further, some implementations are heuristic-based models for self-managing deployment of and orchestrating updates for containerized services. In various implementations, the heuristic-based model achieves automated and seamless deployment and updates. Particular implementations of a system and a method using the heuristic-based model can bring a control pane and services pane as a single deployable unit and provide better control on appliances running as services on a customer's environment.

Thus, various implementations of the heuristic-based model can accommodate each customer's environment. For example, customer environments vary in the number of services included in a customer's environment, as well as the types of services in the customer's environment. Accordingly, various implementations of the heuristic-based model provide differentiated updates to each customer depending on their environment.

For example, select implementations of the model can provide updates depending on various factors in a customer environment (e.g., types of services used, number of services used, types of updates to be performed). Various implementations can use a multi-tenant server to service the deployment and updates to each customer.

In various implementations, the heuristic-based model can self-manage the deployment and the update lifecycle of containerized services. Thus, select implementations of the heuristic-based model can serve as a single, deployable product with a control and application pane embedded in it. In other words, the control and application pane is automatically deployed as part of the heuristic-based model. Accordingly, the control and application pane does not require the overhead of an additional deployment, according to various implementations.

An advantage of various implementations of this approach can include self-managing deployment of containerized services. A further advantage can include automatic updates for containerized services shipped as a part of an appliance to a customer. Some implementations can reduce the cost of IT operations by removing the overhead to orchestrate and manage the containerized services. Select implementations have a small footprint, as well as deployment simplicity, making this model ideal for edge and systems including IoT devices.

Figure 1:
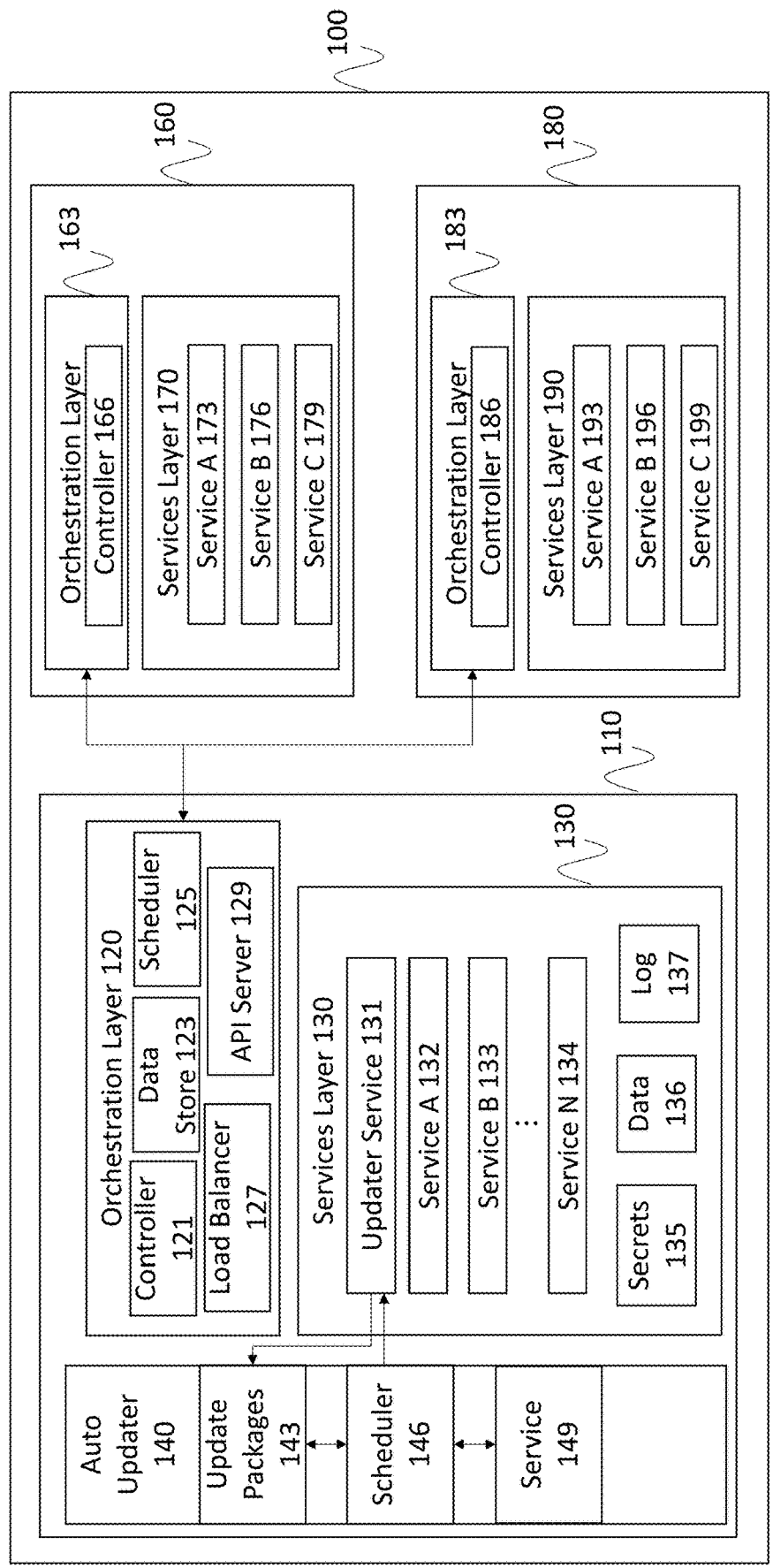
FIG. 1 depicts a block diagram for a heuristic model to self-manage and auto-update containerized services, according to an example implementation.

FIG. 1 depicts a block diagram for a heuristic model 100 to self-manage and auto-update containerized services, according to an example implementation.

The heuristic model 100 includes a primary node 110, a first secondary node 160, and a second secondary node 180.

In the implementation depicted in FIG. 1, the primary node 110 includes an orchestration layer 120, a service layer 130, and an auto updater 140.

The orchestration layer 120 can include a controller 121, a data store 123, a scheduler 125, a load balancer 127, and an application programming interface (API) server 129. The orchestration layer 120 can deploy services (e.g., services 173, 176, 179, 193, 196, 199) to first and second secondary nodes 160, 180. Further, the orchestration layer 120 can manage the services (e.g., services 131, 132, 133, 134, 173, 176, 179, 193, 196, 199) deployed as part of the appliance that includes heuristic model 100. Also, when a deployment is done in a multi-node configuration including more than one secondary node (e.g., including secondary nodes 160, 180), the orchestration layer 120 can manage a cluster including the primary node 110, as well as the secondary nodes.

Further, in various implementations, the orchestration layer 120 monitors the health of services (e.g., services 131, 132, 133, 134, 173, 176, 179, 193, 196, 199) deployed for the customer. In various implementations, the orchestration layer 120 automatically can restart the services based on the service configurations. Further, in some implementations, the orchestration layer 120 automatically can allocate resources of the primary node 110 and/or the secondary nodes 160, 180 to the services based on the service configurations.

In some implementations, the orchestration layer 120 also can perform load balancing of traffic to services amongst the multiple service instances (e.g., services 131, 132, 133, 134, 173, 176, 179, 193, 196, 199) running in the cluster of nodes.

The controller 121 is implemented at least partially as or on physical hardware, such as a processor. The data store 123 is a memory that can store instructions executed by the controller 121 or scheduler 125. The data store 123 can also store other data, such as update packages 143. The scheduler 125 can schedule update packages 143 transmitted to orchestration layers 163, 183 of the secondary nodes 160, 180. The load balancer 127 can balance the traffic to services amongst services 131, 132, 133, 134, 173, 176, 179, 193, 196, 199. In some implementations, the load balancer 127 can also balance the network load produced by transmitting the update packages 143 to the secondary nodes 160, 180. The API server 129 services API calls from local services 132, 133, 134. In some implementations the API server 129 can also service API calls from remote services 173, 176, 179, 193, 196, 199.

Turning to the service layer 130, the service layer 130 includes the actual applications (e.g., services 132, 133, 134) shipped to a customer by a solution provider, in a particular implementation. In other words, the service layer 130 contains the service or group of services that are part of the solution, as well as configurations and data related to the service or group of services.

The service layer 130 includes updater service 131 and services 132, 133, 134. The updater service 131 receives the update packages 143 from the auto updater 140. The services 132, 133, 134 can include at least some of the actual applications shipped to the customer. The updater service 131 can apply the update packages 143 to the services 132, 133, 134 to perform the updating.

The service layer 130 shares secrets memory 135, data memory 136, and log memory 137 with other portions of the primary node 110. The secrets memory 135 can be a protected memory and include passwords, encryption keys, and other confidential information. The data memory 136 can include general data used by primary node 110, possibly without the cost of a protected memory. In one example, the general data includes the schedule for the update packages 143. The general data can also include executables to be deployed to the first secondary node 160 and/or the second secondary node 180 as the services 173, 176, 179, 193, 196, 199.

The log memory 137 can include a log of the updates. For example, the log in the log memory 137 can identify a package update applied to a service, to which service(s) the package was applied, to which instance(s) of the service(s) the package was applied, when the package update was applied to that service, and whether the package update was performed manually by a member of a customer's IT team or automatically by the heuristic model 100.

Turning to the auto updater 140, the auto updater 140 updates the services 132, 133, 134 in the service layer 130, based on a heuristic algorithm on a scheduled interval, in various implementations.

In particular implementations, the auto updater 140 can include update packages 143, a scheduler 146, and a service (e.g., an auto update script) 149. The update packages 143 are received by the scheduler 146. The scheduler 146 controls the transmission of the update packages 143 to the updater service 131 of the service layer 130. In particular, the scheduler 146 can control the transmission of the update packages 143 based on a day (e.g., day of the week, particular date, or holiday) and time.

In addition, the scheduler 146 can transmit package updates to the service 149. The service 149 is a script that can be executed by the scheduler 146 to perform the scheduling and transmission of the update packages 143.

In some implementations, the heuristic model 100 can self-orchestrate its services and auto-update images of the services without using third-party tools.

The first secondary node 160 includes an orchestration layer 163 including a controller 166. The first secondary node also includes a services layer 170. The services layer 170 can include the services 173, 176, 179. The controller 166 can receive the update packages 143 from the orchestration layer 120. The controller 166 can then apply the update packages 143 to the services 173, 176, 179. In some implementations, the services 173, 176, 179 are actual applications shipped to the customer by the solution provider. In particular implementations, the solution provider that shipped services 173, 176, 179 can be different from the solution provider that shipped primary node 110. That is, in some implementations, a third-party vendor can ship the first secondary node 160 including the services 173, 176, 179.

The second secondary node 180 includes an orchestration layer 183 including a controller 186. The first secondary node also includes a services layer 190. The services layer 190 can include the services 193, 196, 199. The controller 186 can receive the update packages 143 from the orchestration layer 120. The controller 186 can then apply the update packages 143 to the services 193, 196, 199. In some implementations, the services 193, 196, 199 are actual applications shipped to the customer by the solution provider. In particular implementations, the solution provider that shipped services 193, 196, 199 can be different from the solution provider that shipped primary node 110. That is, in some implementations, a third-party vendor can ship the second secondary node 180 including the services 193, 196, 199.

Although FIG. 1 illustrates the heuristic model 100 with two secondary nodes 160, 180, the heuristic model 100 can include any number of secondary nodes.

Figure 2A:
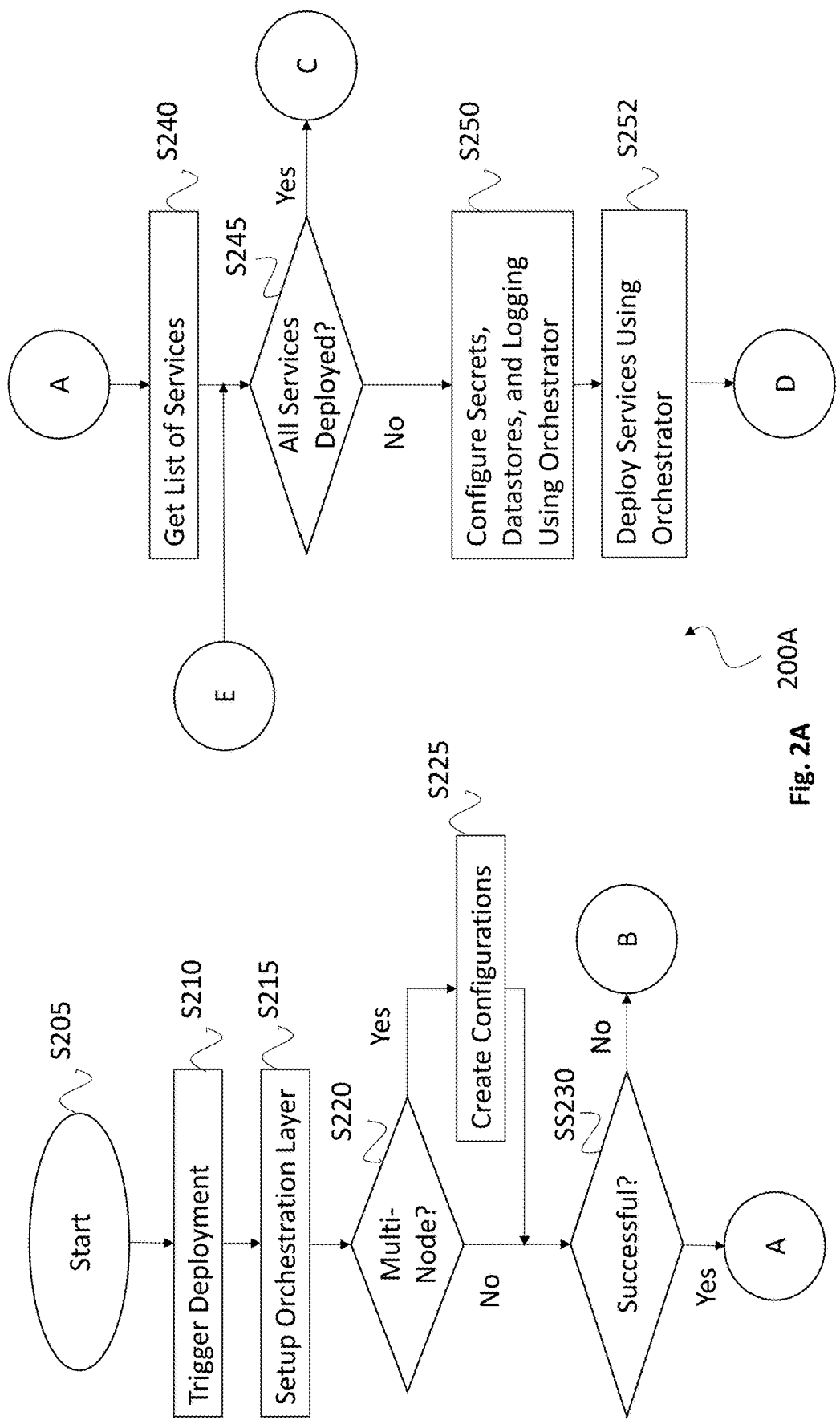
FIGS. 2A and 2B depict an algorithm for an example deployment workflow, according to various implementations.
Figure 2B:
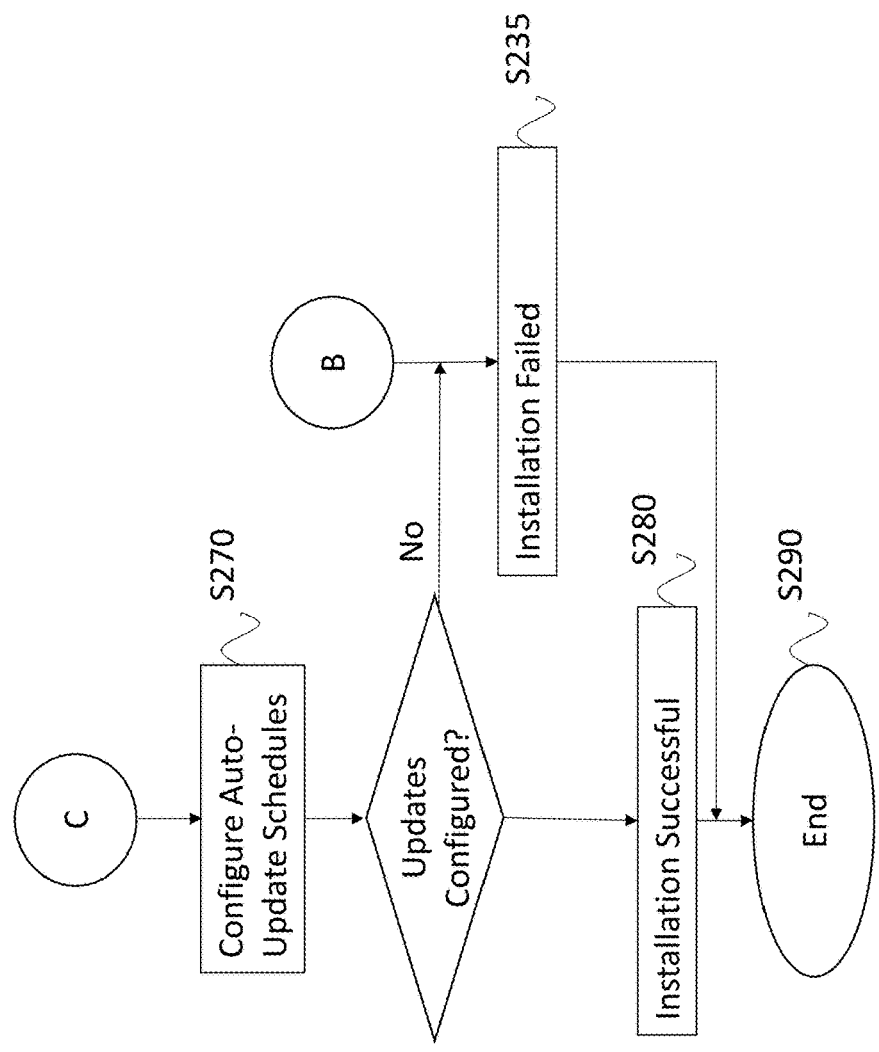
Figure 2B:
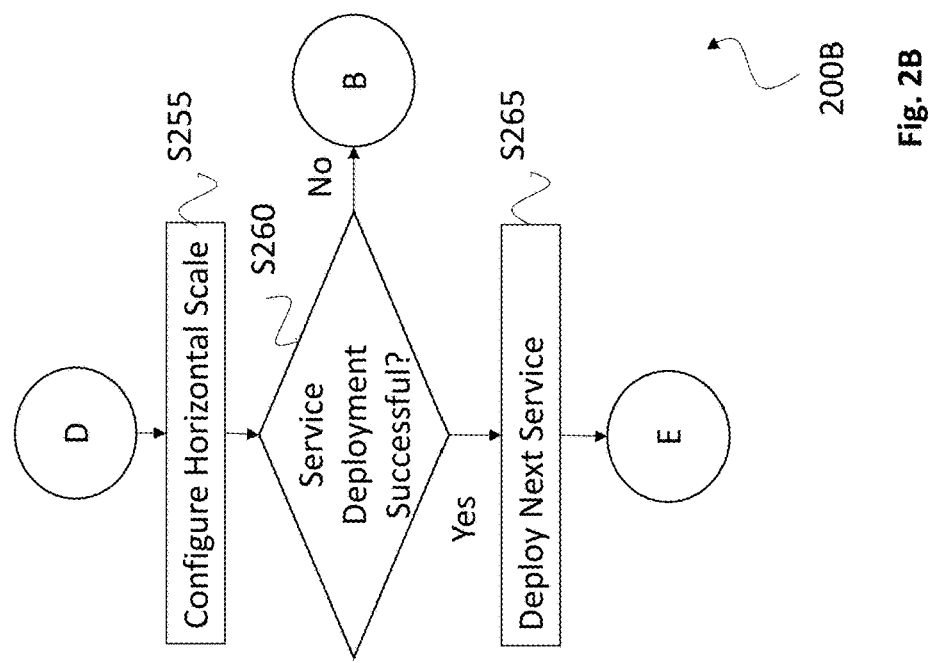

FIGS. 2A and 2B depict an algorithm for an example deployment workflow, according to various implementations. The algorithm starts at S205 and advances to S210.

In S210, the controller 121 of the orchestration layer 120 can trigger (e.g., initiate) a deployment. As discussed below, the deployment can be a single node deployment or a multinode deployment. The algorithm 200 then advances to S215.

In S215, the controller 121 sets up the orchestration layer 120 of the primary node 110, based on data in the data memory 136. The algorithm 200 then advances to S220.

In S220, the controller 121 determines whether the deployment is a multinode deployment. If the controller 121 determines the deployment is a multinode deployment, then the algorithm 200 advances to S225. If the controller 121 determines the deployment is not a multinode deployment (e.g., is a single node deployment), then the algorithm 200 advances to S230.

In S225, the controller 121 creates one or more multinode configurations. For example, the controller 121 additionally deploys, to the controller 166 of the first secondary node 160, data to set up the orchestration layer 163. In some examples, the controller 121 additionally deploys, to the controller 186 of the second secondary node 180, data to set up the orchestration layer 183. The algorithm 200 then advances to S230.

In S230, the controller 121 determines whether the deployment of the orchestration layers is successful. If the controller 121 determines that the deployment of the orchestration layers is not successful, then the algorithm 200 advances to S235. If the controller 121 determines the deployment of the orchestration layers is successful, then the algorithm 200 advances to S240.

In S235, the controller 121 determines that the installation failed. The controller 121 can perform a remedial action, such as storing a log of the installation in the log memory 137 or alerting an IT team. The algorithm 200 then advances to S290.

In S240, the controller 121 retrieves a list of services to be deployed. In at least one implementation, the list of services is retrieved from the data memory 136. Some implementations use a data structure other than a list. Further, the controller 121 can retrieve the list (or other data structure) from the secrets memory 135 or other memory. The controller 121 also determines an initial service to deploy of the list of services. In various implementations, the initial service can be the first service in the list, the highest priority service, or the most fundamental service (e.g., a bootstrapping service). The algorithm 200 then advances to S245.

In S245, the controller 121 determines whether the controller 121 or, more broadly, the orchestration layer 120 has deployed all of the services on the list (or other data structure). If the controller 121 determines that all of the services on the list have been deployed, then the algorithm 200 advances to S270. If the controller 121 determines that all of the services on the list have not been deployed, then the algorithm 200 advances to S250.

In S250, the controller 121 configures the memories. For example, in particular implementations, the controller 121 can configure the secrets in the secrets memory 135 using the orchestration layer 120. Further, the controller 121 can configure the data in the data memory 136 using the orchestration layer 120. In addition, the controller 121 can configure logging in the log memory 137 using the orchestration layer 120. In performing these configurations, the controller 121 can retrieve data to deploy services. The algorithm 200 then advances to S252.

In S252, the controller 121 deploys the current service using the orchestration layer 120. For example, in the case of a single node deployment, the controller 121, via the orchestration layer 120, can deploy services 132, 133, 134 within the services layer 130 of the primary node 110. In the case of a multinode deployment, the controller 121, via the orchestration layer 120, can deploy services 173, 176, 179 within the services layer 170 of the first secondary node 160 and/or services 193, 196, 199 within the services layer 190 of the second secondary node 180. The algorithm 200 the advances to S255.

In S255, the controller 121 configures the horizontal scale, if applicable. For example, there are multiple configurations available within Kubernetes to configure a service for horizontal scaling. The algorithm 200 then advances to S260.

In S260, the controller 121 determines whether the deployment of the current service was successful. If the controller 121 determines the deployment of the service was successful, then the algorithm 200 advances to S265. If the controller 121 determines the deployment of the service was unsuccessful, then the algorithm 200 advances to S285.

In S265, the controller 121 advances to the next service on the list (or other data structure). The algorithm 200 then returns to S245.

In S270, the controller 121 configures one or more schedules for automatically updating the services on the list. For example, the controller 121 can determine particular days, dates, and/or times to update the services. In some implementations, the controller 121 configures a respective schedule for updating each service. In other implementations, the controller 121 configures a schedule for updating all of the services.

Of course, the controller 121 can also configure schedules for more than one service but fewer than all services. In one example, the controller 121 can schedule a first type of services to be updated at a first time and a second type of services to be updated at a second time. In some implementations, the types of services can be categorized by a developer of the services or by a client request.

The algorithm 200 then advances to S275.

In S275, the controller 121 determines whether the updates were successfully configured. If the controller 121 determines that the updates were not successfully configured, the algorithm 200 advances to S235. If the controller 121 determines that the updates were successfully configured, the algorithm advances to S280.

In S280, the controller 121 determines that the controller 121 successfully deployed the services. In some implementations, the controller 121 stores a log of the successful installation in the log memory 137. The algorithm 200 then advances to S290.

In S285, the controller 121 determines that the controller 121 did not successfully deploy the services. In some implementations, the controller 121 stores a log of the unsuccessful installation in log memory 137. The algorithm 200 then advances to S290.

In S290, the algorithm 200 concludes.

Figure 3A:
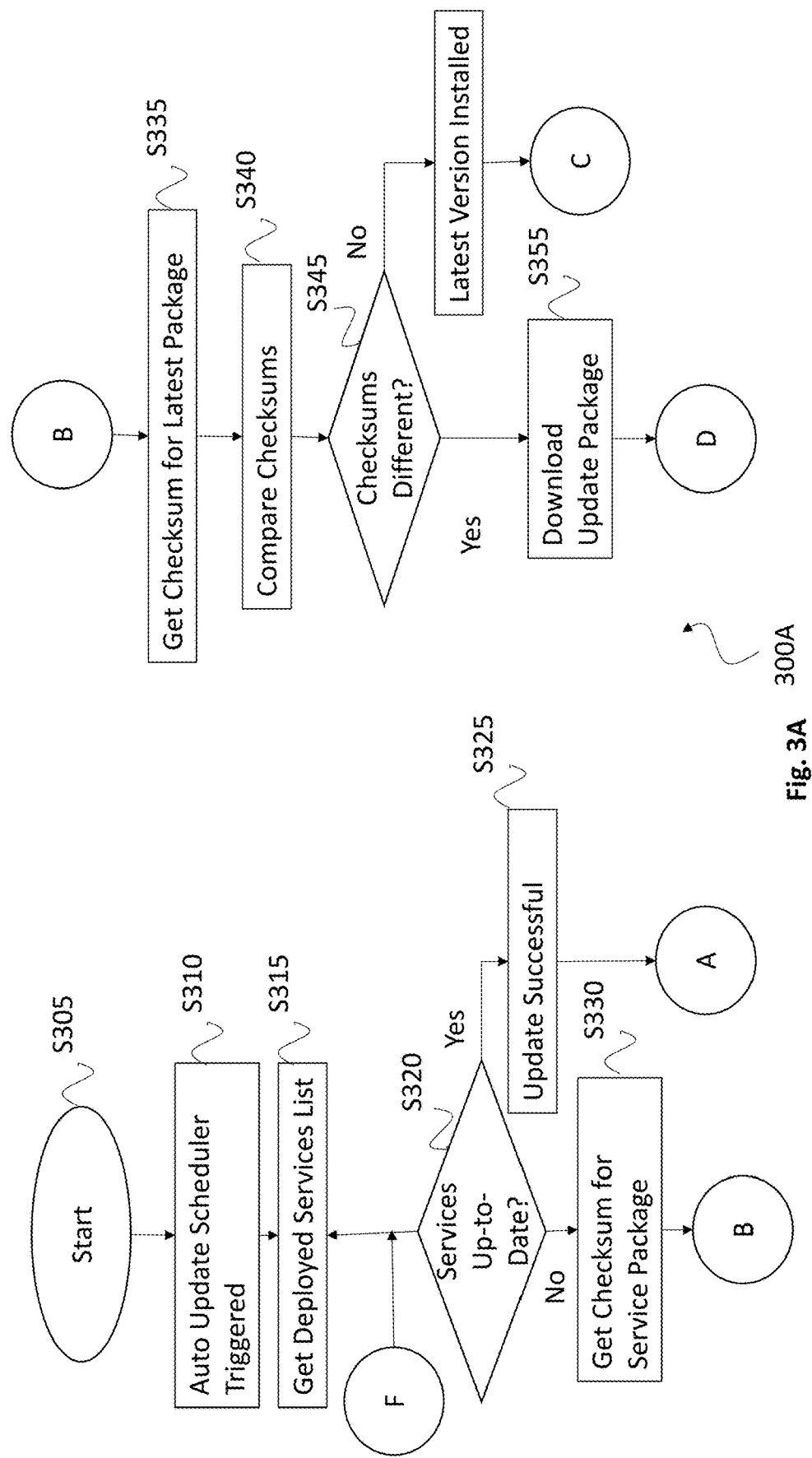
FIGS. 3A and 3B depict an algorithm 300 for an example auto-update workflow, according to various implementations.
Figure 3B:
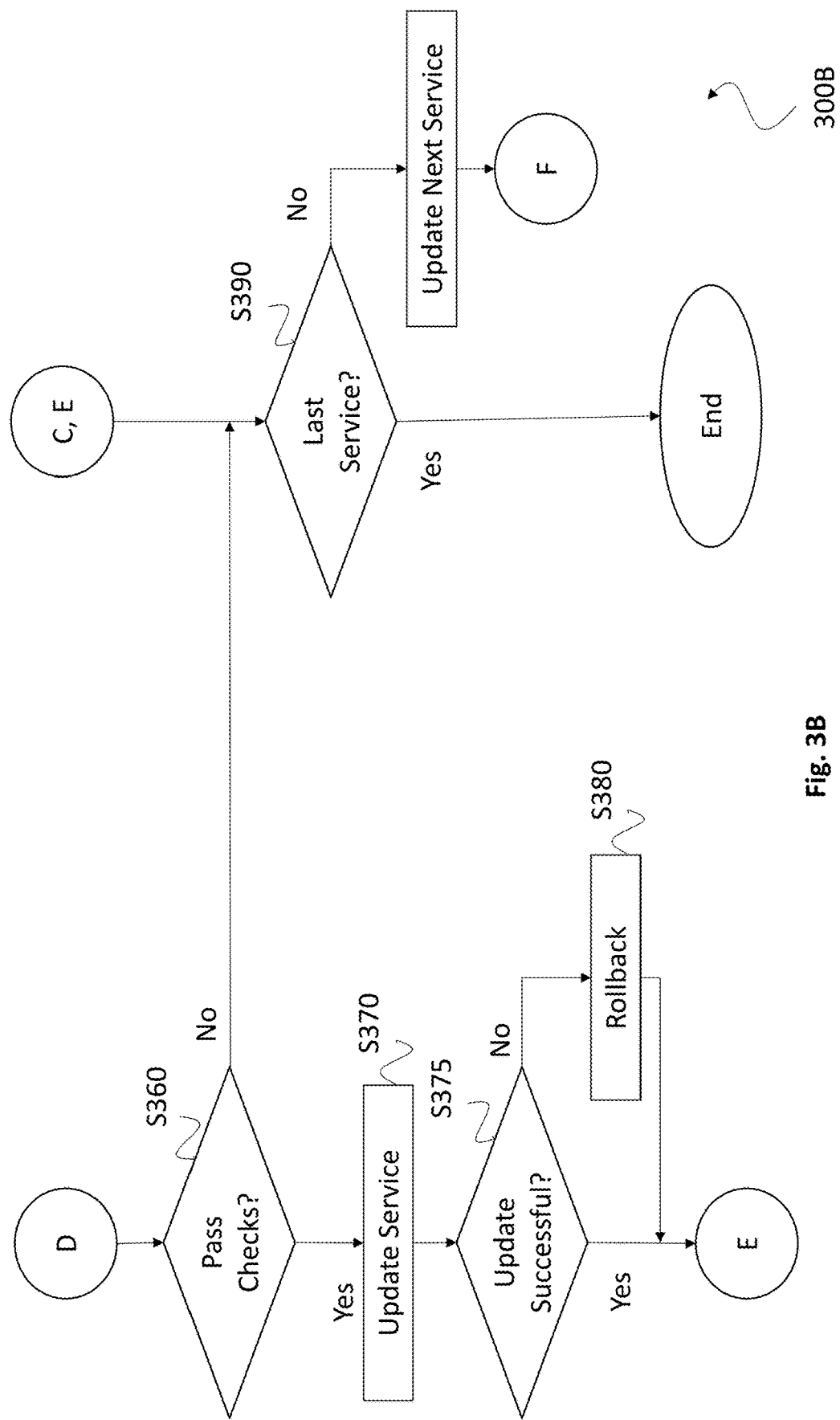

FIGS. 3 and 3B depict an algorithm 300 for an example auto-update workflow, according to various implementations.

The algorithm 300 begins at S305. The algorithm 300 then advances to S310.

In S310, the controller 121 is triggered by the auto updater 140. For example, the scheduler 146 can determine that a current time is a particular date, time, or day on which service updates have been scheduled. In another example, the service 149 can determine that a new version of a service has been received or that an updated file (e.g., malware definitions) for a service have been received. The algorithm 300 then advances to S315.

In S315, the controller 121 retrieves a list (or other data structure) of deployed services. The controller 121 can retrieve the list from the data store 123 or the log memory 137. Alternatively, the controller 121 can retrieve the list by querying the services layer 130. In select implementations, the auto updater 140 can instruct the controller 121 which services to update. This instruction can be performed by the scheduler 146 or the service 149.

In a multinode implementation, the orchestration layer 120 can query the orchestration layer 163 of the first secondary node 160 or the orchestration layer 183 of the second secondary node 180. Accordingly, the orchestration layer 120 can update deployed services, even if the service was not deployed by the orchestration layer 120 of the primary node 110. The algorithm 300 then advances to S320.

In S320, the controller 121 determines whether all of the services on the list and their files (e.g., definitions) are up-to-date (e.g., are current). If the controller 121 determines the services are up-to-date, then the algorithm 300 advances to S325.

If the controller 121 determines the service are not up-to-date, then the controller 121 selects an initial service on the list. As discussed previously, the selection of the initial service can be based on an urgency, a most recently received update, an update that has been pending the longest, or a service that was least recently updated. Other implementations base the selection on a different criteria. The algorithm 300 then advances to S330.

In S325, the controller 121 determines the update was successfully performed. In some implementations, the controller 121 stores a log of the update in the data store 123 or in the log memory 137. The algorithm then advances to S399.

In S330, the controller 121 retrieves a first checksum. The first checksum is a checksum of a currently deployed package for the selected service. In various implementations, the controller 121 can retrieve the first checksum from the data store 123 or the log memory 137 or by querying the services layer 130. In some implementations, the orchestration layer 120 can query the orchestration layer 163 of the first secondary node 160 or the orchestration layer 183 of the second secondary node 180 for the first checksum. In some implementations, the controller 121 generates the first checksum itself by performing a hashing function. The hashing function can be any known or later-developed hashing algorithm. The algorithm 300 then advances to S335.

In S335, the controller 121 retrieves a second checksum. The second checksum is a checksum for the latest available service package in the backend (e.g., in the auto updater 140). In various implementations, the controller 121 can query the scheduler 146 or the service 149 for the second checksum. According to some implementations, the orchestration layer 120 queries a developer of the service for the second checksum or otherwise receives the second checksum from the developer (e.g., by a data exchange layer). In select implementations, the controller 121 can generate the second checksum based on the update packages 143. The algorithm 300 then advances to S340.

In S340, the controller 121 compares the first checksum retrieved in S330 with the second checksum retrieved in S335. The algorithm 300 then advances to S345.

In S345, the controller 121 determines whether the first checksum is different from the second checksum. If the controller 121 determines that the checksums are not different (e.g., are the same), then the algorithm 300 advances to S350. If the processor determines that the checksums are different, then the algorithm 300 advances to S355.

In S350, the controller 121 determines that the latest version of the selected service is installed. The algorithm 300 then advances to S390.

In S355, the controller 121 causes the orchestration layer 120 to download the service package having the second checksum (e.g., the latest update package). In some implementations in which the orchestration layer 120 received the second checksum from a developer in S335, the orchestration layer 120 requests the update package from the developer. In particular implementations, the orchestration layer 120 requests the update package via a data exchange layer. In other implementations, the orchestration layer 120 can request and receive the update package from the auto updater 140. The algorithm 300 then advances to S360.

In S360, the controller 121 can perform one or more checks on the update package. In one implementation, the controller 121 can check whether the update package supports the operating system installed on the primary node 110. In another implementation, the controller 121 can check whether the update package support the operating system installed on the first secondary node 160 and/or the second secondary node 180. Further, the controller 121 can check whether the primary and/or secondary nodes have particular resources. Such resources can include a number of processor bits or processor speed, an available amount of memory, or a quantity of bandwidth. The controller 121 can perform other checks, as well.

If the controller 121 determines that the update package passes the one or more checks, then the algorithm 300 advances to S370. If the controller 121 determines that the update package does not pass the one or more checks, then the controller 121 makes a notification, and the algorithm 300 advances to S395.

In S370, the controller 121 performs an update of the service with the update package downloaded in S355. In various implementations, the update is a rolling update that attempts to update a service, one instance at a time, to avoid affecting the runtime. When the last instance is updated, the rolling update stops. If there are any errors in the process, the rolling update rolls back to the previous working instance.

In some implementations, the orchestration layer 120 updates one of the services 132, 133, 134 in the services layer 130. In other implementations, the orchestration layer 120 transmits the update package to the first secondary node 160 and/or the second secondary node 180. The orchestration layer 120 can also transmit an instruction to the first secondary node 160 and/or the second secondary node 180 to install the update package. In some implementations, the orchestration layer 120 can instead transmit an instruction to the first secondary node 160 and/or the second secondary node 180 to download the update package (e.g., from the developer) and install the update package. The algorithm 300 then advances to S375.

In S375, the controller 121 determines whether the update performed in S370 was successful. For example, the controller 121 can determine whether the service layer 130 output an error message during the update. Further, the controller 121 can determine whether the orchestration layer 120 received any error messages from the first secondary node 160 and/or the second secondary node 180. If the controller 121 received any such error messages, then the controller 121 can determine the update performed in S370 was unsuccessful. If the controller 121 did not receive any such error messages, then the controller 121 can determine the update performed in S370 was successful.

Of course, in some implementations, the service layer 130, the first secondary node 160, and/or the second secondary node 180 can instead send confirmation messages confirming a successful installation.

If the controller 121 determines the update was not successful, then the algorithm 300 advances to S380. If the controller 121 determines the update was successful, the algorithm 300 advances to S390.

In S380, the controller 121 rolls back the update performed in S370. For example, the controller 121 can use a log in the log memory 137 to determine what updates were made and how to roll back the updates. In some implementations, the controller 121 can access a previous version of the service saved in the data memory 136. The algorithm 300 then advances to S390.

In S390, the controller 121 determines whether the current service is the last service in the list (or other data structure) of deployed services. If the controller 121 determines the current service is the last service in the list, then the algorithm 300 advances to S399. If the controller 121 determines the current service is not the last service in the list, then the algorithm 300 advances to S395.

In S395, the controller 121 advances to the next service in the list (or other data structure). The algorithm 300 then returns to S320.

In S399, the algorithm 300 concludes.

Figure 4:
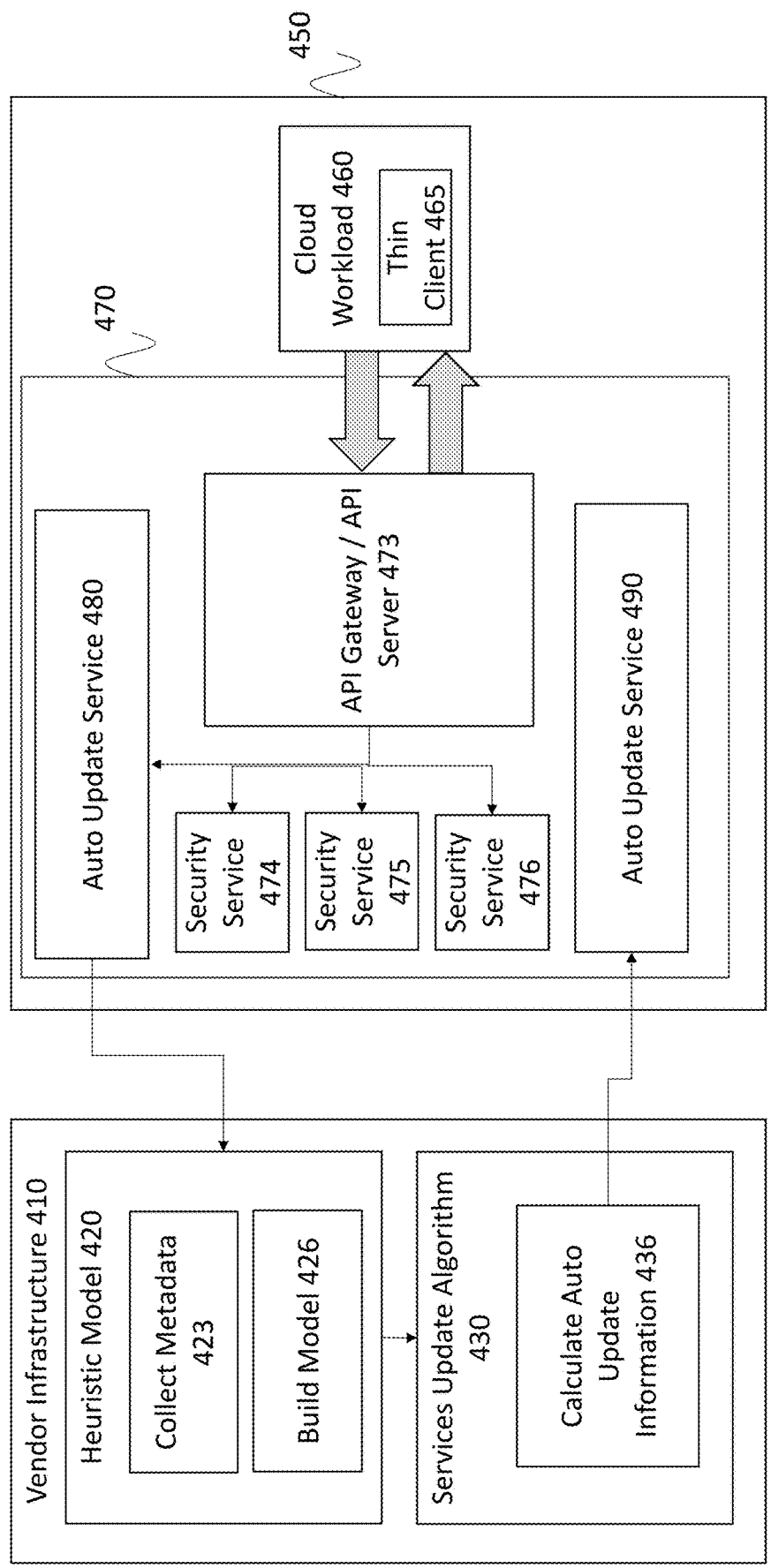
FIG. 4 depicts a conceptual diagram of an example system, according to various implementations.

FIG. 4 depicts a conceptual diagram of an example system 400, according to various implementations.

The example system 400 includes a security-as-a-service (SECaaS) vendor infrastructure 410 and customer infrastructure 450. The SECaaS vendor infrastructure 410 includes a heuristic model 420 and a service update algorithm 430. The customer infrastructure 450 includes a Point of Presence (POP) 470 and a cloud workload 460.

The cloud workload 460 can include a thin client 465. Additionally or alternatively, the cloud workload 460 can be implemented with virtual machines (VMs), containers, or be serverless. The cloud workload transmits an API call to the POP 470.

The POP 470 includes security services 474, 475, 476. The POP 470 also includes API gateway/API server 473. In addition, the POP 470 includes a function of an auto update service 480 and a function of an auto update service 490. Typically, the POP 470 is a Kubernetes environment.

The API gateway/API server 473 receives the API call from the cloud workload 460. The API gateway/API server then transmits the API call to one or more of the security services 474, 475, 476, as well as to the auto update service 480.

The security services 474, 475, 476 can be implemented with containers. Accordingly, in various implementations of the present disclosure, the security services 474, 475, 476 can be auto updated by the disclosed heuristic model. In one implementation, the security service 474 is a malware scanner.

The security service(s) 474, 475, 476 that received the API call transmit a response to the API gateway/API server 473.

The auto update service 480 collects metadata from the API call received from the API gateway/API server 473. In addition, the auto update service 480 can generate additional metadata, based on the metadata received from the API call. In some implementations, the metadata includes a number of API calls received by each of the security services 474, 475, 476, the name and version of the API, the timestamp of the API call, details of the caller service (e.g., an ID of the cloud workload 460), the name and version of the security services 474, 475, 476, and/or any relevant policy settings for the POP 470. Of course, in other implementations, the metadata includes other information relating to the API call.

The auto update service 480 transmits at least a portion of the metadata to the heuristic model 420 of the SECaaS vendor infrastructure 410.

The heuristic model 420 includes a first function 423 and a second function 426. The first function 423 receives the metadata transmitted from the customer infrastructure 450 and collects (e.g., stores) the metadata. In some implementations, the metadata is stored in association with an identifier of the POP 470 (e.g., a POP ID).

The second function 426 of the heuristic model 420 is building the heuristic model. The heuristic model considers data such as usage of security services by the POP, the usage of APIDs and versions, the dependencies of callers (e.g., cloud workloads) based on API versions, the dependencies of callers based on usage of security services, a comparison of the peak and non-peak hours of usage of API calls, and the compatibility between different versions of the security services.

In particular implementations, the SECaaS vendor infrastructure 410 receives, from a publisher of the security services 474, 475, 476, the dependencies and compatibilities of the callers and the security services. In many implementations, an owner of the SECaaS vendor infrastructure 410 (e.g., the vendor) maintains the dependencies and compatibilities of the callers and the security services.

In select implementations, the SECaaS vendor infrastructure 410 can extract dependencies from the security services 474, 475, 476. Such an extraction can depend on the deployment model for the security services and the type of package from which the security services are installed or updated. For example, because primary node 110 (e.g., at least partially implementing the SECaaS vendor infrastructure 410) can deploy services (e.g., including update packages 143) in particular implementations, the primary node 110 can extract dependencies from the update packages 143. Thus, the SECaaS vendor infrastructure 410 can extract the dependencies without the intervention of the customer infrastructure 450.

Further, the SECaaS vendor infrastructure 410 can augment compatibility information via other heuristic models.

In some implementations, the orchestration layer 120 of the customer infrastructure 450 can observe the services layer 130 running a set of security services 474, 475, 476 without any errors. In this case, the auto update service 480 can collect metadata identifying the name of the running services and the versions of the running services. The auto update service 480 can transmit the names and versions to the heuristic model 420. The heuristic model 420 can then determine the names and versions of the running services are compatible with each other. Thus, the heuristic model 420 can apply the compatibility determination to the services from POP 470 or to services from a different POP. Thus, the heuristic model 420 can identify service compatibility without publisher or vendor input.

The services update algorithm 430 is applied to the built heuristics model. More specifically, in 433, the SECaaS vendor infrastructure 410 calculates auto update information 436. The auto update information 436 can include a list (or other data structure) of the names of services to update, along with their versions. This list can maintain compatibility between the services. The auto update information 436 can include a time/date/day window for an update. Further, the auto update information 436 can include policy settings for the update. In some implementations, these policy settings can consider the customer's preferences. The SECaaS vendor infrastructure 410 can transmit the auto update information to the auto update service 490.

The auto update service 490 performs the update based on the auto update information 436. In particular, the auto update service 490 can initiate the updates at a time based on the time/date/day window. Further, the auto update service 490 can apply the policy settings included in the auto update information 436. In some implementations, as discussed with reference to S380, the auto update service 490 can roll the update back to the existing (e.g., the previous) version in case of errors and to reduce (e.g., minimize) downtime during updates.

Although illustrated as including two auto update services 480, 490, many implementations include one auto update service that performs the operations of both services.

Figure 5:
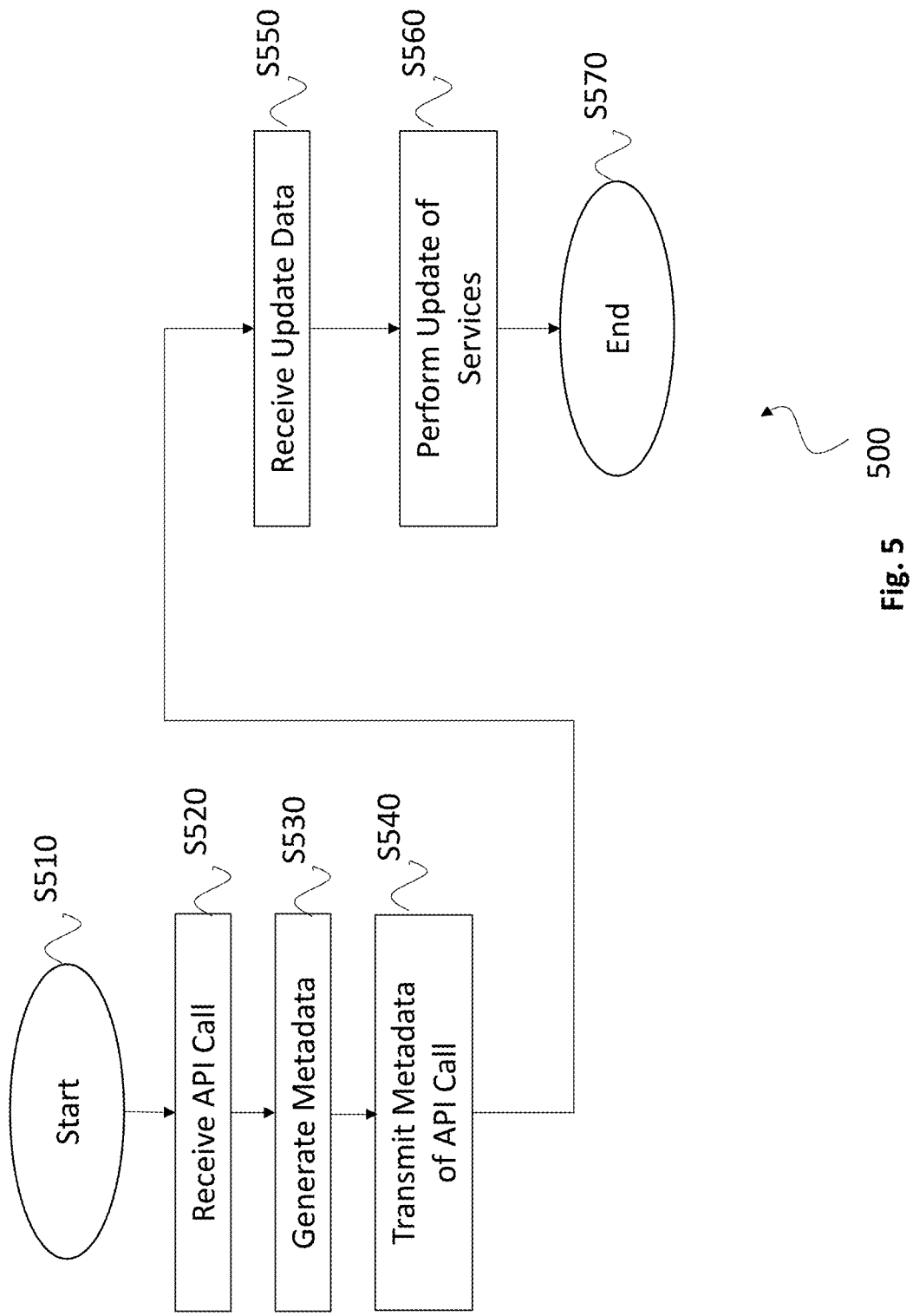
FIG. 5 depicts an example algorithm, performed by a customer infrastructure, according to various implementations.

FIG. 5 depicts an example algorithm 500, performed by a customer infrastructure, according to various implementations. The algorithm 500 begins at S510 and advances to S520.

At S520, the processor (e.g., controller 121) receives an API call from a cloud workload (e.g., cloud workload 460). The API call indicates a security service. The algorithm 500 then advances to S530.

In S530, the processor generates metadata, at least in part based on the API call. For example, the metadata can include the name and version of the indicated security service and the timestamp of the API call. The processor can also increment the number of API calls received for the security service and include, within the metadata, the incremented number. The metadata can include the name and version of the API, as well as an identifier of the cloud workload that made the call. The algorithm 500 then advances to S540.

In S540, the POP 470 transmits the metadata to the SECaaS vendor infrastructure 410. The algorithm 500 then advances to S550.

In S550, the POP 470 receives from the SECaaS vendor infrastructure 410 auto update information. The auto update information can include a list (or other data structure) of names of services to be updated and the versions to which the named services should be updated. The auto update information can also include a time/date/day window in which the named services are to be updated. In select implementations, the auto update information also can include policy settings for the update and can reflect the customer's preferences for the update. Further, in some implementations, the auto update information can include an update package for a particular service.

The algorithm 500 then advances to S560.

In S560, the orchestration layer 120 of the POP 470 performs the update of the security services 474, 475, 476, at least in part based on the auto update information. For example, the orchestration layer 120 can apply an update package to the named services to the listed versions, based on the list (or other data structure). The orchestration layer 120 can perform the update within the time/date/day window included in the auto update information. In some implementations, the orchestration layer 120 can contact the publisher for the update package. In other implementations, the update package is included in the auto update information. The algorithm 500 then advances to S570.

In S570, the algorithm 500 ends.

Figure 6:
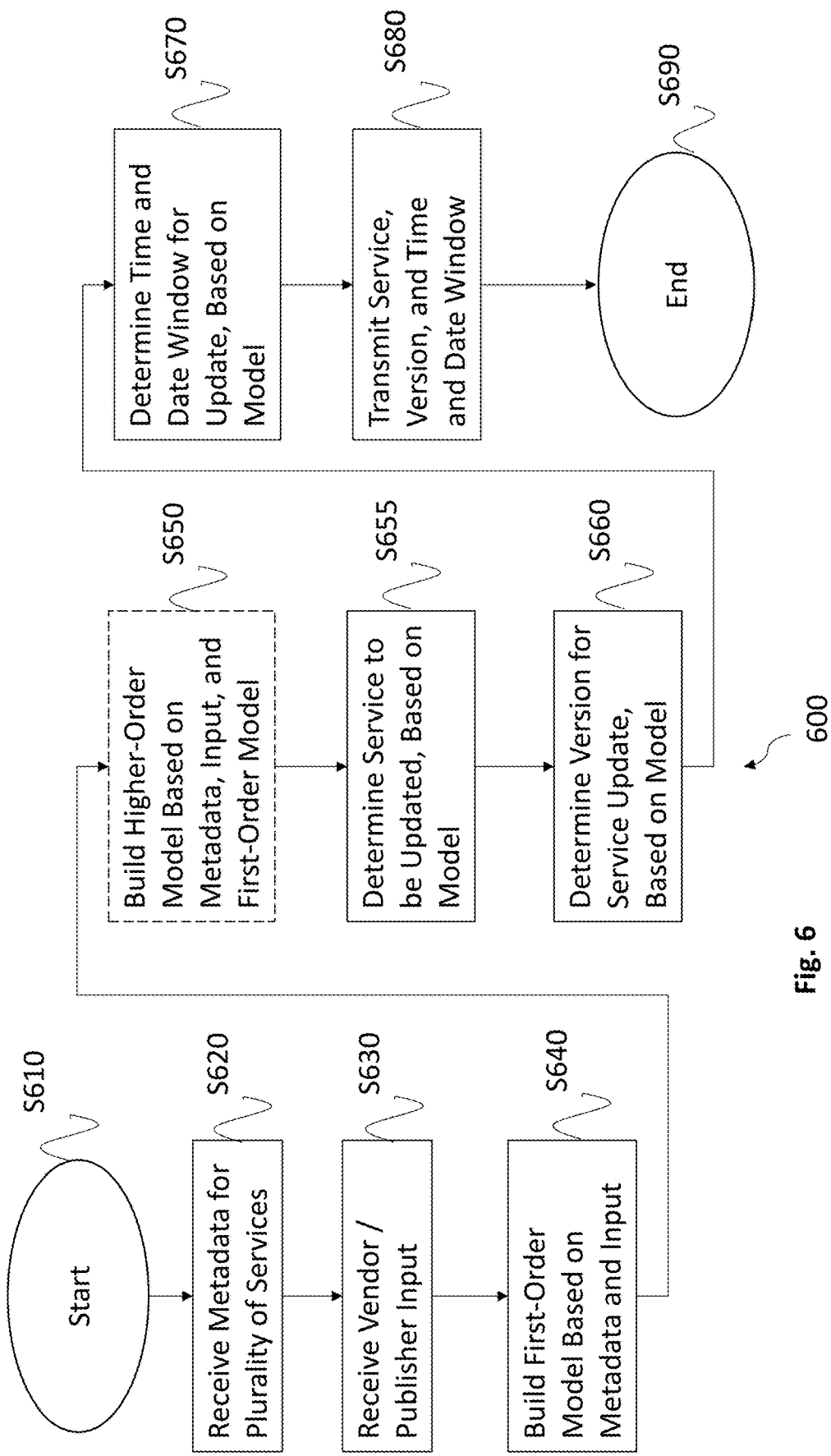
FIG. 6 depicts an example algorithm, performed by a SECaaS vendor infrastructure, according to various implementations.

FIG. 6 depicts an example algorithm 600, performed by a SECaaS vendor infrastructure, according to various implementations.

The example algorithm 600 begins as S610 and advances to S620.

In S620, a network interface of the SECaaS vendor infrastructure receives metadata from the POP. The metadata identifies one or more services. In many implementations, the network interface receives the metadata from multiple POPs of one customer. In several implementations, the network interface receives the metadata from multiple POPs for multiple customers. The algorithm 600 then advances to S630.

In S630, the network interface of the SECaaS vendor infrastructure receives information from a vendor and/or a publisher. In many implementations, the network interface receives dependency information from the service developers. In some implementations, the network interface receives the dependency information from the orchestration layer of the POP. The algorithm then advances to S640.

In S640, the controller of the SECaaS vendor infrastructure builds a first-level heuristic-based model, at least partially based on the metadata received in S620 and the dependencies received in S630. Three types of first-level models include Usage of APIs and Versions, Usage of Security Services, and Peak vs Non-Peak hours.

The APIs and Versions Usage model is at least partially based on the name of an API, the versions of the API that are called, and the number of calls to the version of the API.

The Security Services Usage model is at least partially based on the name of a security service, the versions of the security services that are called, the names of the APIs calling the security service, the versions of the APIs calling the security service, and the number of calls to the version of the security service.

In some implementations, the Security Services Usage model also is at least partially based on the API call timestamp. In such an implementation, the Security Services Usage model can consider the frequency of calls to the services. Advantageously, such a model can consider when the service can be updated to reduce downtime.

The Peak vs Non-Peak hours model is at least partially based on the timestamp of the API call, the name of the API that was called, the version of the called API, and the name of the security service that the API called. Various implementations of the Peak vs Non-Peak hours model are at least partially based on names of the services that are calling the API.

The Peak vs Non-Peak hours model constructs a baseline of peak vs non-peak hours. Thus, many implementations of this model can output the time and date window for updating the security service called by the API. That is, by executing the model, the controller can determine a time and date during which the API is called a minimal number of times.

After building the first-level model, the algorithm 600 then advances to optional S650.

In optional S650, the controller builds a higher-level heuristic model, at least in part based on the first-level heuristic model built in S640. Three types of second-level models include Dependency of Callers based on API Versions, Dependency of Callers based on Usage of Security Services, and Compatibility between versions of services.

The Dependency of Callers based on API Versions model is at least partially based on the caller service details (e.g., name of the cloud workload that made the API call) and the version of the API called by the caller. In addition, this model can be at least partially based on the Usage of APIs and Versions model built in S640. Thus, the Dependency of Callers based on API Versions model can be considered a second-level model.

The Caller Dependency Security Services Usage model is at least partially based on input received from the vendor and/or publisher in S630. Specifically, the model is at least partially based on the availability of updates from the vendor/publisher that are marked as security fixes. Further, the Caller Dependency Security Services Usage can be at least partially based on the Usage of Security Services model built in S640 and the Dependency of Callers based on API Versions model built in S650.

The controller of the infrastructure can determine, based on the Caller Dependency Security Services Usage model, services that are unused. The controller also can determine, based on the Caller Dependency Security Services Usage model, that there are no security fixes available for a service. The controller of the infrastructure can determine not to update a particular service. Similarly, the controller can determine, based on the Caller Dependency Security Services Usage model, which services are used and for which an update is available. Thus, based on the Caller Dependency Security Services Usage model, the controller can determine to update a particular service.

The Caller Dependency Security Services Usage model can be considered a third-order model.

The Service Version Compatibility model is at least partially based on input received from the vendor and/or publisher in S630. Specifically, the input received in S630 can include a list (or other data structure) of names of known compatible and incompatible services. This list can supplement the names by including the known compatible or incompatible versions. In some implementations, the list can also include compatible and/or incompatible callers (e.g., cloud workloads).

The Service Version Compatibility model is at least partially based on the first-order Security Services Usage model and/or the third-order Caller Dependency Security Services Usage model. Thus, the Service Version Compatibility model can be considered a fourth-order model.

Based on the Service Version Compatibility model, the controller can determine names of services that can be safely updated and the versions to which the services can be updated.

The algorithm 600 then advances to S655.

In S655, the controller determines a service to be updated. In some implementations, the controller determines the service based on input from a vendor/publisher that a new version of the service is available. In other implementations, the controller determines the service at least partially based on a higher-order model determined in S650. For example, the controller can determine the service at least partially based on the Service Version Compatibility model and the Caller Dependency Security Services Usage model. The algorithm 600 then advances to S660.

In S660, the controller determines the versions to which the service determined in S655 is to be updated. This determination is at least partially based on the first-order heuristic model built in S640. In particular, this determination can be based on the Caller Dependency Security Services Usage and Service Version Compatibility models. Specifically, this determination can be based on whether the Dependency Security Services Usage model indicates whether a new version is available for a service. This determination can also be based on whether the Service Version Compatibility model indicates that a version of the service safely can be updated (or cannot be updated safely). The algorithm 600 then advances to S670.

In S670, the controller determines the time and date window for an update of the service determined in S655. This determination can be at least partially based on a first-order heuristic model determined in S640, such as the Peak Hours model. The algorithm 600 then advances to S680.

In S680, the controller instructs the infrastructure to transmit a name of the service determined in S655 and the version determined in S660 to the customer from which the metadata was received in S620. The controller also instructs the infrastructure to transmit the time and date window determined in S670. In some implementations, the controller instructs the infrastructure to transmit the update package (e.g., including an executable file) to the customer instead of or in addition to the name of the service and version. The algorithm 600 then advances to S690.

In S690, the algorithm 600 ends.

Although illustrated in FIG. 6 as discrete operations, the network interface of the SECaaS vendor infrastructure can perform operations S620 and S630 at any time, in various implementations. That is, in many implementations, the network interface can receive the metadata and dependencies at almost any time.

Figure 7:
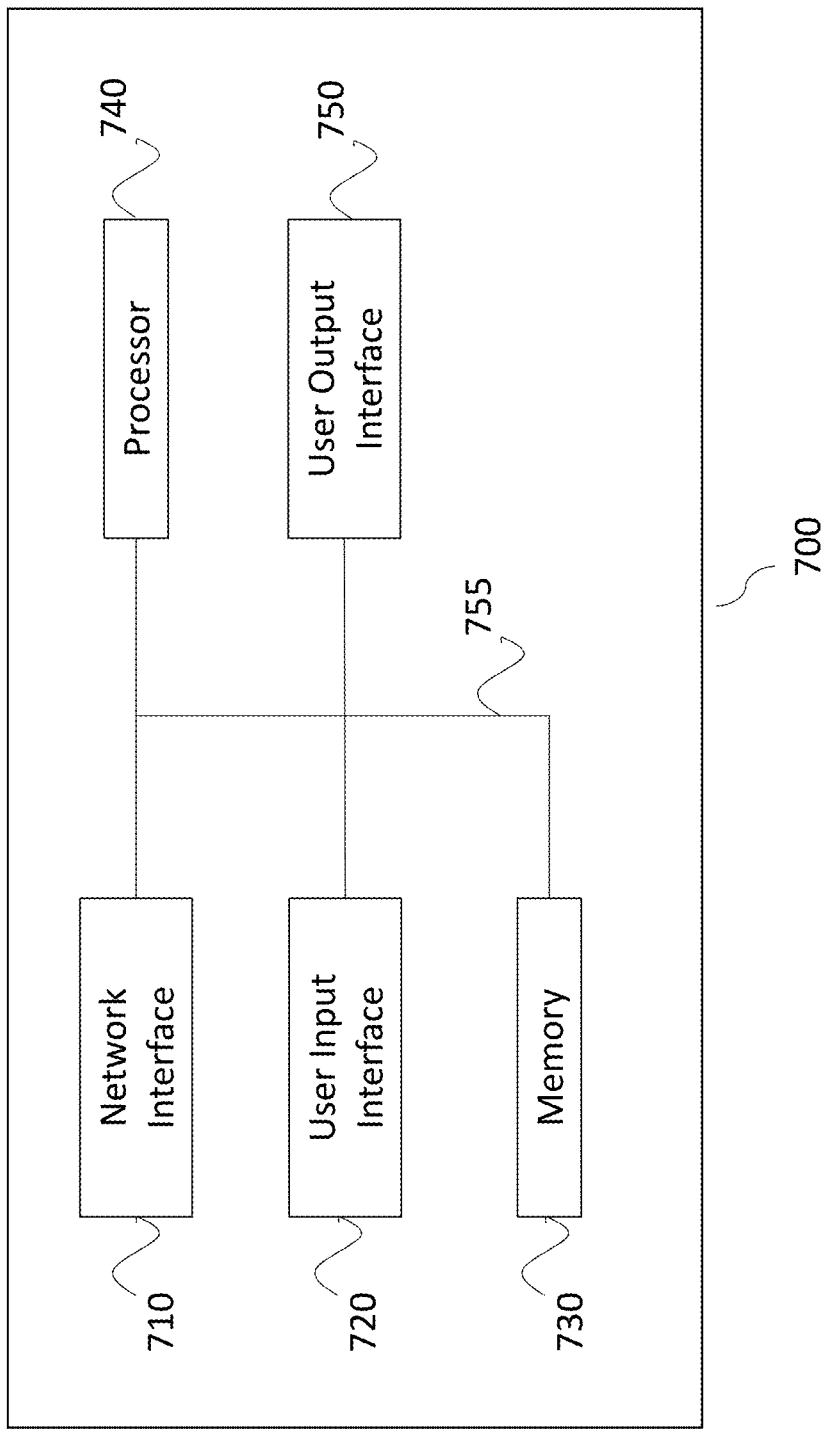
FIG. 7 illustrates a computing device, according to an implementation of the present disclosure.

FIG. 7 illustrates a computing device 700, according to an implementation of the present disclosure.

Although illustrated within a single housing, the computing device 700 can be distributed across plural housings or sub-systems that cooperate in executing program instructions. In some implementations, the computing device 700 can include one or more blade server devices, standalone server devices, personal computers (including laptop computers and tablet computers), routers, hubs, switches, bridges, firewall devices, intrusion detection devices, mainframe computers, network-attached storage devices, video game systems, smartphones and other mobile telephones, and other computing devices. The computing device 700 can execute the Windows® OS in many implementations. The hardware of the computing device 700 can be configured according to a Symmetric Multi-Processing (SMP) architecture or a Non-Uniform Memory Access (NUMA) architecture.

The computing device 700 can include a network interface 710 that provides one or more communication connections and/or one or more devices that allow for communication between the computing device 700 and other computing systems (not shown) over a communication network or collection of networks (not shown) or the air. The network interface can communicate using near-field communications (NFC), Wi-Fi™, Bluetooth, Ethernet, cellular (e.g., 4G, 5G), facsimile, or any other wired or wireless interface.

The computing device 700 can also include a user input interface 720 that receives inputs from a human. The user input interface 720 can be or include a mouse, a touchpad, a keyboard, a touchscreen, a trackball, a camera, a microphone, a joystick, a game controller, a scanner, or any other input device.

The computing device 700 can include a memory 730, also termed a "storage." The memory 730 can include or be one or more computer-readable storage media readable by a processor 740 and that store software. The memory 730 can be implemented as one storage device and can also be implemented across multiple co-located or distributed storage devices or sub-systems. The memory 730 can include additional elements, such as a memory controller, that communicate with the processor 740. The memory 730 can also include storage devices and/or sub-systems on which data and/or instructions are stored. The computing device 700 can access one or more storage resources to access information to carry out any of the processes indicated in this disclosure and, in particular, FIGS. 2A-2B, 3A-3B, and 5-6.

The memory 730 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a hard drive, a cache memory, a flash memory, a removable disk, or a tape reel. The memory 730 can be or include resistive RAM (RRAM) or a magneto-resistive RAM (MRAM). Other implementations are possible.

A message queuing program 760 stored in memory 730 can include routines for at least partially performing at least one of the processes illustrated in 2A-2B, 3A-3B, and 5-6 and can be implemented in program instructions. Further, the software, when executed by the computing device 700 in general or the processor 740 specifically, can direct, among other functions, the computing device 700 or the processor 740 to perform the message queuing as described herein.

The computing device 700 can include a processor 740 (e.g., a processing unit). The processor 740 can perform the operations the customer infrastructure or the vendor infrastructure. The processor 740 can be or include one or more hardware processors and/or other circuitry that retrieve and execute software from the memory 730. The processor 740 can be implemented within one processing device, chip, or package and can also be distributed across multiple processing devices, chips, packages, or sub-systems that cooperate in executing program instructions. In some implementations, the processor 540 is or includes a Graphics Processing Unit (GPU).

The processor 740 can have any register size, such as a 32-bit register or a 64-bit register, among others. The processor 740 can include multiple cores. Implementations of the processor 740 are not limited to any particular number of threads. The processor 740 can be fabricated by any process technology, such as 14 nm process technology.

The computing device 700 can also include a user output interface 750 that outputs information to a human user. The user output interface 750 can be or include a display (e.g., a screen), a touchscreen, speakers, a printer, or a haptic feedback unit. In many implementations, the user output interface 750 can be combined with the user input interface 720 to include, for example, a touchscreen or a headset including headphones and a microphone.

In implementations including multiple computing devices, a server of the system or, in a serverless implementation, a peer can use one or more communications networks that facilitate communication among the computing devices. For example, the one or more communications networks can include or be a local area network (LAN), a wide area network (WAN), or a metropolitan area network (MAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, and cache memory, and to transitory storage media, such as carrier waves or propagating signals.

Aspects of the system for the heuristic model for auto-updating can be implemented in various manners (e.g., as a method, a system, a computer program product, or one or more computer-readable storage media). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various implementations, different operations and portions of the operations of the algorithms described can be performed by different processing units. Furthermore, aspects of the present disclosure can take the form of a computer program product implemented in one or more computer-readable media having computer-readable program code implemented, e.g., encoded or stored, thereon. In various implementations, such a computer program can, for example, be downloaded (or updated) to existing devices and systems or be stored upon manufacture of these devices and systems.

The detailed description presents various descriptions of specific implementations. The innovations described can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, particular implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve the developer's specific goals, including compliance with system, business, and/or legal constraints that can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, and supporting chipsets) and computer-readable memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the drawings can be implemented as stand-alone modules (e.g., a device with associated components and circuitry configured to perform a specific application or function) or implemented as plug-in modules into application-specific hardware of electronic devices.

Implementations of the present disclosure can be readily included in a system-on-chip (SOC) package. An SOC represents an integrated circuit (IC) that integrates components of a computer or other electronic system into one chip. The SOC can contain digital, analog, mixed-signal, and radio frequency functions on one chip substrate. Other implementations can include a multi-chip-module (MCM) with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), a programmable logic array (PLA), programmable array logic (PAL), generic array logic (GAL), and other semiconductor chips.

The specifications, dimensions, and relationships outlined herein (e.g., the number of processors and logic operations) have been offered for non-limiting purposes of example and teaching. Such information can be varied considerably. For example, various modifications and changes can be made to arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in any manner. Along similar design alternatives, the illustrated components, modules, and elements of the drawings can be combined in various possible configurations within the scope of this disclosure. In some cases, it is clearer to describe one or more of the functionalities of a given set of flows by referencing a reduced number of electrical elements. The electrical circuits of the drawings and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation," "example implementation," "an implementation," "another implementation," "some implementations," "various implementations," "other implementations," "alternative implementation," and the like are intended to mean that any such features are included in one or more implementations of the present disclosure and might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example A1, an apparatus includes a network interface that receives an application programming interface (API) call for an API, transmits a call report, and receives an update request; and a processor configured to perform a security service, at least in part based on the API call, wherein the call report includes an API name of the API, a service name of the security service, and an identifier of the apparatus, the update request includes the name of the security service, and the processor further is configured to update the security service, at least in part based on the update request.

Example A2 is the apparatus of Example A1, wherein the call report includes a name of a process that called the API and an API version of the API, the update request includes an identifier of a service version of the security service, and the processor further is configured to update the security service to the service version.

Example A3 is the apparatus of Example A2, wherein the call report includes a number of calls to the API and an identifier of a version of the security service.

Example A4 is the apparatus of any of Examples A1-A3, wherein the call report includes a first policy setting, and the update request includes a second policy setting.

Example A5 is the apparatus of any of Examples A1-A4, wherein the call report includes a timestamp of the API call, the update request includes a time and date window, and the processor further is configured to update the security service, at least in part based on the time and date window.

Example A6 is the apparatus of Example A2 or Example A3, wherein the call report includes an identifier of an earlier version of the security service, and the processor further is configured to roll back a version of the security service from the service version to the earlier version.

Example A7 is the apparatus of any of Examples A1-A6, wherein the processor further is configured to restart the security service, at least in part based on the update request.

In Example A8, a method includes receiving an application programming interface (API) call for an API; transmitting a call report; receiving an update request; performing a security service, at least in part based on the API call, wherein the call report includes an API name of the API, a service name of the security service, and an identifier of the apparatus, and the update request includes the name of the security service; and updating the security service, at least in part based on the update request.

Example A9 is the method of Example A8, further comprising: updating the security service to a service version, wherein the call report includes a name of a process that called the API and an API version of the API, and the update request includes an identifier of the service version of the security service.

Example A10 is the method of Example A9, wherein the call report includes a number of calls to the API and an identifier of a version of the security service.

Example A11 is the method of any of Examples A8-A10, wherein the call report includes a first policy setting, and the update request includes a second policy setting.

Example A12 is the method of any of Examples A8-A11, further comprising: updating the security service, at least in part based on a time and date window, wherein the call report includes a timestamp of the API call, the update request includes the time and date window.

Example A13 is the method of Example A9 or Example A10, further comprising: rolling back a version of the security service from the service version to an earlier version, wherein the call report includes an identifier of the earlier version.

Example A14 is the method of any of Examples A8-A13, further comprising: restarting the security service, at least in part based on the update request.

In Example A15, a non-transitory, computer-readable medium encoded with executable instructions that, when executed by a processing unit, perform operations comprising: receiving an application programming interface (API) call for an API; transmitting a call report; receiving an update request; performing a security service, at least in part based on the API call, wherein the call report includes an API name of the API, a service name of the security service, and an identifier of the apparatus, and the update request includes the name of the security service; and updating the security service, at least in part based on the update request.

Example A16 is the medium of Example A15, the operations further comprising: updating the security service to a service version, wherein the call report includes a name of a process that called the API and an API version of the API, and the update request includes an identifier of the service version.

Example A17 is the medium of Example A16, wherein the call report includes a number of calls to the API and an identifier of a version of the security service.

Example A18 is the medium of any of Examples A15-A17, wherein the call report includes a first policy setting, and the update request includes a second policy setting.

Example A19 is the medium of any of Examples A15-A18, the operations further comprising: updating the security service, at least in part based on a time and date window, wherein the call report includes a timestamp of the API call, and the update request includes the time and date window.

Example A20 is the medium of Example A16 or Example 17, the operations further comprising: rolling back a version of the security service from the service version to an earlier version, wherein the call report includes an identifier of the earlier version.

Example A21 is the medium of any of Examples A15-A20, the operations further comprising: restarting the security service, at least in part based on the update request.

In Example B1, an apparatus includes a network interface that receives a call report including an application programming interface (API) name of an API, a service name of a security service, and an identifier of a customer apparatus; and a processor configured to build a first first-order model, at least in part based on the API name, to perform a determination that an update for the security service is available, and to produce an update request, at least in part based on the first-order model and the determination, wherein the network interface transmits the update request to the customer apparatus.

Example B2 is the apparatus of Example B1, wherein the call report includes a process name of a process that called the API, the processor further is configured to build a higher-order model, at least in part based on the process name and the first-order model, and the update request is at least in part based on an output of the higher-order model.

Example B3 is the apparatus of Example B2, wherein the call report includes a service version of the security service, and the higher-order model indicates an incompatibility with the service version.

Example B4 is the apparatus of any of Examples B1-B3, wherein the call report includes a timestamp for a call to the API, the processor further is configured to build a second first-order model, at least in part based on the timestamp, to produce a time and date, and the update request includes the time and date.

Example B5 is the apparatus of any of Examples B1-B4, wherein the call report includes an indicator of a first version of the security service, and the update request includes an indicator of a second version of the security service.

Example B6 is the apparatus of any of Examples B1-B5, wherein the call report includes a number of calls to the API and a service version of the security service.

Example B7 is the apparatus of any of Examples B1-B6, wherein the call report includes a first policy setting, and the update request includes a second policy setting.

In Example B8, a method includes receiving a call report including an application programming interface (API) name of an API, a service name of a security service, and an identifier of a customer apparatus; building a first first-order model, at least in part based on the API name; performing a determination that an update for the security service is available; producing an update request, at least in part based on the first-order model and the determination; and transmitting the update request to the customer apparatus.

Example B9 is the method of Example B8, further comprising: building a higher-order model, at least in part based on the first-order model and a process name of a process that called the API, wherein the call report includes the process name, and the update request is at least in part based on an output of the higher-order model.

Example B10 is the method of Example B9, wherein the call report includes a service version of the security service, and the higher-order model indicates an incompatibility with the service version.

Example B11 is the method of any of Examples B8-B10, further comprising: building a second first-order model, at least in part based on a timestamp for a call to the API, to produce a time and date, wherein the call report includes the timestamp, and the update request includes the time and date.

Example B12 is the method of any of Examples B8-B11, wherein the call report includes an indicator of a first version of the security service, and the update request includes an indicator of a second version of the security service.

Example B13 is the method of any of Examples B8-B12, wherein the call report includes a number of calls to the API and an identifier of a service version of the security service.

Example B14 is the method of any of Examples B8-B13, wherein the call report includes a first policy setting, and the update request includes a second policy setting.

In Example B15, a non-transitory, computer-readable medium is encoded with executable instructions that, when executed by a processing unit, perform operations comprising: receiving a call report including an application programming interface (API) name of an API, a service name of a security service, and an identifier of a customer apparatus; building a first first-order model, at least in part based on the API name; performing a determination that an update for the security service is available; producing an update request, at least in part based on the first-order model and the determination; and transmitting the update request to the customer apparatus.

Example B16 is the medium of Example B15, the operations further comprising: building a higher-order model, at least in part based on the first-order model and a process name of a process that called the API, wherein the call report includes the process name, and the update request is at least in part based on an output of the higher-order model.

Example B17 is the medium of Example B16, wherein the call report includes a service version of the security service, and the higher-order model indicates an incompatibility with the service version.

Example B18 is the medium of any of Examples B15-B17, the operations further comprising: building a second first-order model, at least in part based on a timestamp for a call to the API, to produce a time and date, wherein the call report includes the timestamp, and the update request includes the time and date.

Example B19 is the medium of any of Examples B15-B18, wherein the call report includes an indicator of a first version of the security service, and the update request includes an indicator of a second version of the security service.

Example B20 is the medium of any of Examples B15-B19, wherein the call report includes a number of calls to the API and an identifier of a service version of the security service.

Example B21 is the medium of any of Examples B15-B20, wherein the call report includes a first policy setting, and the update request includes a second policy setting.

We claim:

1. An apparatus comprising:
   a network interface circuit to receive a call report including an application programming interface (API) name of an API, a service name of a security service, one or more records of first calls received by the security service via the API, and an identifier of a customer apparatus at which the security service and the API are deployed, the one or more records of first calls including respective timestamps;
   instructions; and
   a processor circuit to utilize the instructions to:
      based on the call report, build a first-order model of the first calls to the API for the security service;
      determine that an update for the security service is available; and
      based on the first-order model, schedule the update for the security service to occur during a period when second calls to the API for the security service are expected to be reduced with respect to the first calls, the network interface circuit to transmit an instruction to cause the customer apparatus to update the security service during the period.

2. The apparatus of claim 1, wherein the call report includes a process name of a process that called the API, and the processor circuit is to:
   build a higher-order model based on the process name and the first-order model; and
   schedule the update based on an output of the higher-order model.

3. The apparatus of claim 2, wherein the call report includes a service version of the security service, and the output of the higher-order model indicates an incompatibility with the service version.

4. The apparatus of claim 1, wherein the first-order model is a first first-order model, and the processor circuit is to:
   build a second first-order model based on the respective timestamps; and
   produce, based on the second first-order model, a time and a date at which the update is to occur, the time and the date during the period.

5. The apparatus of claim 1, wherein the call report includes an indicator of a first version of the security service, and the update corresponds to a second version of the security service.

6. The apparatus of claim 1, wherein the call report includes a service version of the security service.

7. The apparatus of claim 1, wherein the call report includes a first policy setting, and the update corresponds to a second policy setting.

8. A method comprising:
   receiving a call report including an application programming interface (API) name of an API, a service name of a security service, one or more records of first calls received by the security service via the API, and an identifier of a customer apparatus at which the security service and the API are deployed, the one or more records of first calls including respective timestamps;
   based on the call report, building a first-order model of the first calls to the API for the security service;
   determining that an update for the security service is available;
   based on the first-order model, scheduling the update for the security service to occur during a period when second calls to the API for the security service are expected to be reduced with respect to the first calls; and
   transmitting an instruction to cause the customer apparatus to update the security service during the period.

9. The method of claim 8, further including:
building a higher-order model based on the first-order model and a process name of a process that called the API, the call report including the process name; and
scheduling the update based on an output of the higher-order model.

10. The method of claim 9, wherein the call report includes a service version of the security service, and the output of the higher-order model indicates an incompatibility with the service version.

11. The method of claim 8, wherein the first-order model is a first first-order model, and the method further includes:
building a second first-order model based on the respective timestamps; and
producing, based on the second first-order model, produce a time and a date at which the update is to occur, the time and the date during the period.

12. The method of claim 8, wherein the call report includes an indicator of a first version of the security service, and the update corresponds to a second version of the security service.

13. The method of claim 8, wherein the identifier is a first identifier, and the call report includes a second identifier of a service version of the security service.

14. The method of claim 8, wherein the call report includes a first policy setting, and the update corresponds to a second policy setting.

15. A non-transitory computer-readable medium comprising executable instructions that, when executed, cause one or more processor circuits to:
access a call report including an application programming interface (API) name of an API, a service name of a security service, one or more records of first calls received by the security service via the API, and an identifier of a customer apparatus at which the security service and the API are deployed, the one or more records of first calls including respective timestamps;
based on the call report, build a first-order model of the first calls to the API for the security service;
determine that an update for the security service is available;
based on the first-order model, schedule the update for the security service to occur during a period when second calls to the API for the security service are expected to be reduced with respect to the first calls; and
cause transmission of an instruction to cause the customer apparatus to update the security service during the period.

16. The non-transitory computer-readable medium of claim 15, wherein the executable instructions cause at least one of the one or more processor circuits to:
build a higher-order model based on the first-order model and a process name of a process that called the API, the call report including the process name; and
schedule the update based on an output of the higher-order model.

17. The non-transitory computer-readable medium of claim 16, wherein the call report includes a service version of the security service, and the output of the higher-order model indicates an incompatibility with the service version.

18. The non-transitory computer-readable medium of claim 15, wherein the first-order model is a first first-order model, and the executable instructions cause at least one of the one or more processor circuits to:
build a second first-order model based on the respective timestamps; and
produce, based on the second first-order model, a time and a date at which the update is to occur, the time and the date during the period.

19. The non-transitory computer-readable medium of claim 15, wherein the call report includes an indicator of a first version of the security service, and the update corresponds to a second version of the security service.

20. The non-transitory computer-readable medium of claim 15, wherein the identifier is a first identifier, and the call report includes a second identifier of a service version of the security service.

\* \* \* \* \*

UNITED STATES PATENT AND TRADEMARK OFFICE
CERTIFICATE OF CORRECTION

PATENT NO. : 12,143,426 B2
APPLICATION NO. : 17/720860
DATED : November 12, 2024
INVENTOR(S) : Bhattacharya et al.

Page 1 of 1

It is certified that error appears in the above-identified patent and that said Letters Patent is hereby corrected as shown below:

On the Title Page

In Item (72), under Inventors, delete "Abhisek Sanyal, Bangalore, IN (US);" and insert -- Abhisek Sanyal, Bangalore (IN); --

In Item (73), under Assignee, insert -- Musarubra US LLC, San Jose, CA (US) --

In the Claims

In Column 23, Claim 11, Line 15, delete "produce"

Signed and Sealed this
Fourth Day of March, 2025

Coke Morgan Stewart
*Acting Director of the United States Patent and Trademark Office*